US008849653B2

(12) United States Patent  
Bauman et al.

(10) Patent No.: US 8,849,653 B2
(45) Date of Patent: Sep. 30, 2014

(54) UPDATING DICTIONARY DURING APPLICATION INSTALLATION

(75) Inventors: Brian Bauman, Austin, TX (US); Amanda J. Burton, Austin, TX (US); Michael P. Carlson, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2909 days.

(21) Appl. No.: 11/382,299

(22) Filed: May 9, 2006

(65) Prior Publication Data

US 2007/0265832 A1 Nov. 15, 2007

(51) Int. Cl.
G06F 17/20 (2006.01)
G06F 17/27 (2006.01)
G06F 17/00 (2006.01)
G06F 17/21 (2006.01)

(52) U.S. Cl.
CPC .......... *G06F 17/2735* (2013.01); *G06F 17/273* (2013.01)
USPC ................. 704/10; 704/9; 715/256; 715/257; 715/258; 715/259; 715/260

(58) Field of Classification Search
USPC ......... 704/9, 10, 260, 258; 715/256, 257, 259
See application file for complete search history.

(56) References Cited

U.S. PATENT DOCUMENTS

| 5,406,480 | A | * | 4/1995 | Kanno | 704/10 |
|---|---|---|---|---|---|
| 5,604,897 | A | | 2/1997 | Travis | |
| 5,649,222 | A | | 7/1997 | Mogilevsky | |
| 5,812,863 | A | | 9/1998 | Ishikawa | |
| 5,970,492 | A | * | 10/1999 | Nielsen | 707/10 |
| 6,047,300 | A | | 4/2000 | Walfish | |
| 6,282,508 | B1 | * | 8/2001 | Kimura et al. | 704/10 |
| 6,334,102 | B1 | * | 12/2001 | Lewis et al. | 704/255 |
| 6,345,245 | B1 | * | 2/2002 | Sugiyama et al. | 704/10 |
| 6,708,311 | B1 | | 3/2004 | Berstis | |
| 6,782,510 | B1 | | 8/2004 | Gross | |
| 6,785,869 | B1 | | 8/2004 | Berstis | |
| 7,136,876 | B1 | * | 11/2006 | Adar et al. | 707/104.1 |
| 7,228,270 | B2 | * | 6/2007 | Aso | 704/10 |
| 7,277,883 | B2 | * | 10/2007 | DeVorzon et al. | 707/706 |
| 7,313,516 | B2 | * | 12/2007 | Oshima | 704/10 |
| 7,430,716 | B2 | * | 9/2008 | Weir | 715/257 |
| 7,987,459 | B2 | * | 7/2011 | Chow et al. | 717/168 |
| 2002/0010726 | A1 | * | 1/2002 | Rogson | 707/533 |
| 2002/0143828 | A1 | * | 10/2002 | Montero et al. | 707/533 |
| 2002/0184101 | A1 | * | 12/2002 | Gidadhubli et al. | 705/26 |

(Continued)

*Primary Examiner* — Paras D Shah
(74) *Attorney, Agent, or Firm* — John Flynn; Jeffrey L. Streets

(57) ABSTRACT

Methods, computer program products and systems for updating a dictionary on a computer are provided including identifying a set of words included with an application program being installed on the computer and identifying one or more installed dictionaries within the computer. The dictionaries that are identified, typically by searching the computer for installed dictionaries, may then be updated by adding one or more words of the set to at least one of the installed dictionaries. Optionally, one or more installed dictionaries may be identified by the user responding to a query asking the user to identify dictionaries or applications that contain dictionaries installed on the computer. An application programming interface may add the words to the dictionaries by associating the installed dictionaries with one or more installed application programs and identifying an API that is specific for the application and using the API to update the dictionaries.

3 Claims, 2 Drawing Sheets

(56) References Cited

U.S. PATENT DOCUMENTS

| | | |
|---|---|---|
| 2003/0028369 A1* | 2/2003 | Aso .................................. 704/10 |
| 2003/0233251 A1* | 12/2003 | Haskell et al. .................... 705/2 |
| 2004/0181391 A1* | 9/2004 | Inoue et al. ...................... 704/10 |
| 2004/0205672 A1* | 10/2004 | Bates et al. .................... 715/533 |
| 2004/0210435 A1* | 10/2004 | Oshima ........................... 704/10 |
| 2005/0080797 A1* | 4/2005 | Short ............................. 707/100 |
| 2005/0251743 A1* | 11/2005 | Ishikawa et al. ............... 715/532 |
| 2006/0100856 A1* | 5/2006 | Kang et al. ........................ 704/9 |

* cited by examiner

UPDATING DICTIONARY DURING APPLICATION INSTALLATION

BACKGROUND OF THE INVENTION

1. Field of the Invention

This invention relates generally to improved data processing methods and systems and, in particular, to methods and systems for updating dictionaries in computer application programs.

2. Description of the Related Art

Jargon is the bane of life in the modern world. Scientists and engineers are confronted with journals and papers that are filled with technical jargon. Government agencies produce voluminous reports with special terms and acronyms. Computer programmers concoct new terms and acronyms that are specific to a computer application program that is being developed. Computer program products often have terms and component names that are unique to the product and/or unique to a specialized field that the computer program application may be specifically tailored for use, such as medicine or law.

Many documents are produced for business, school or for personal use on word processors, spread sheets, data bases and other application programs. Users of these programs have come to rely on spell checking programs (spell checkers) to check the spelling of the words in a document and to identify those words that are incorrectly spelled. Each application program used for producing documents typically includes a spell checker and each of these spell checkers has an associated dictionary file that contains a list of correctly spelled words. To check the spelling of a word in a document, the spell checker searches the dictionary for that word. If the word is in the dictionary, then the word is correctly spelled. Otherwise, the word is misspelled. The spell checker typically reports the misspelling to the user and prompts the user to correct the spelling. The spell checker then replaces the misspelled word with the correctly spelled word.

The typical spell checker also allows the user to add words to the dictionary. The jargon, terms, component names, acronyms and other words that are newly developed or are not otherwise commonly used except in a specialized field are not initially included in the spell checker dictionary. Instead, these words must be added to the dictionary by the user each time the new word is singled out as being misspelled by the spell checker. Alternatively, the spell checker dictionary may include a dialogue box for adding words to the dictionary before they are singled out by the spell checker as being misspelled in a document.

In either case, individually adding new words into a dictionary can be a cumbersome and/or error prone process since the unknown words may be erroneously spelled by the user when being added to the spell checker dictionary. Therefore, it would be advantageous to have a method and apparatus for automatically updating dictionaries with new words and/or words used only in highly specialized fields.

SUMMARY OF THE INVENTION

Embodiments of the present invention include methods, computer program products and systems for updating a dictionary on a computer system. Particular methods of the present invention may include identifying a set of words included with an application program being installed on the computer system and identifying one or more installed dictionaries within the computer system. The dictionaries that are identified may then be updated by adding one or more words of the set to at least one of the installed dictionaries. The set of words may be selected from terms, phrases, names, acronyms or combinations thereof. The dictionaries may be identified by searching the computer system for the installed dictionaries. Optionally, one or more installed dictionaries may be identified by the user responding to a query asking the user to identify dictionaries or applications that contain dictionaries installed on the computer system. Dictionaries installed on the system may include those that are associated with a spell checker application.

The method of the particular embodiment may further include the steps of determining that at least one of the installed dictionaries includes definitions and identifying one or more definitions included with the application program. Each of the one or more identified definitions are associated with the one or more words of the set. The definition dictionary may then be updated by adding the one or more definitions to the definition dictionary.

Further steps of the particular embodiment may include steps that prevent duplication of entries in the installed dictionaries. Duplication of entries could otherwise occur by being updated with the one or more words from the set of words that are already contained in the installed dictionaries. Such steps include comparing each word of the set of words with entries of the installed dictionaries and determining whether one or more words of the set are duplicates of the entries. The dictionaries are then updated by adding the one or more words of the set that are not duplicates of the entries. When determining whether the one or more words of the set are duplicates of the entries, the method may include a step of considering capitalization state, punctuation marks or combinations thereof.

Consideration may also be given to the language of the various dictionaries. In a particular embodiment of the present invention, the method may further include grouping the set of words by language and determining a language used for each of the installed dictionaries. The installed dictionaries may then be updated by adding the one or more words of the set that match the language used for the installed dictionaries.

The words from the word set may be added to the dictionaries using an application programming interface. Particular embodiments of the invention include associating the one or more installed dictionaries with one or more installed application programs and identifying an application programming interface that is specific for at least one of the installed application programs. The one or more words of the set may be added to the identified dictionaries by utilizing the specific application programming interface to add the one or more words of the set to the at least one of the installed application programs.

The present invention may provide for the user to limit the number of dictionaries that are updated. Particular embodiments of the invention may therefore include querying a user to select which of the identified one or more installed dictionaries to update and receiving input from the user selecting which of the identified dictionaries to update. The selected installed dictionaries may then be updated by adding the one or more words of the set to the selected identified dictionaries.

The search for the installed dictionaries may be conducted through a filter as selected by the user. The filter limits the number of dictionaries that are identified during the search for installed dictionaries on the computer system. Particular embodiments of the invention may include querying the user whether to identify the one or more installed dictionaries through one or more filters and receiving input from the user selecting one or more filters. The search for installed dictionaries is then limited by using the selected filters to identify the one or more installed dictionaries within the computer system.

Embodiments of the present invention also include computer program products comprising a computer useable medium having computer usable code for updating a dictionary on a computer system, the computer product comprising computer useable program code for identifying a set of words included with an application program being installed on the computer system, computer useable program code for identifying one or more installed dictionaries within the computer system, and computer useable program code for adding one or more words of the set to at least one of the installed dictionaries.

The product may further include computer useable program code for associating the one or more installed dictionaries with one or more installed application programs, computer useable program code for identifying an application programming interface that is specific for at least one of the installed application programs and computer useable program code for utilizing the specific application programming interface to add the one or more words of the set to the identified application program.

The present invention further includes a system for updating a dictionary on a computer system. Particular embodiments of the system include the system comprising one or more processors coupled directly or indirectly to one or more memory devices and input/output devices, the input device adapted for loading an application program into at least one of the memory devices during installation of the application program on the computer system, wherein the application program includes a data structure populated with a set of words. The embodiment further includes one or more installed dictionaries stored on at least one of the one or more memory devices and accessible by the one or more processors; wherein the application program includes a logical structure to provide instructions to the one or more processors for updating the dictionary on the computer system including identifying the set of words included with the application program, identifying the one or more installed dictionaries and adding one or more words from the set to at least one of the dictionaries.

The application program of the system may further provide instructions to the one or more processors for associating the one or more installed dictionaries with one or more installed application programs, identifying an application programming interface that is specific for at least one of the installed application programs and utilizing the specific application programming interface to add the one or more words of the set to the identified application program.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

Figure 1:
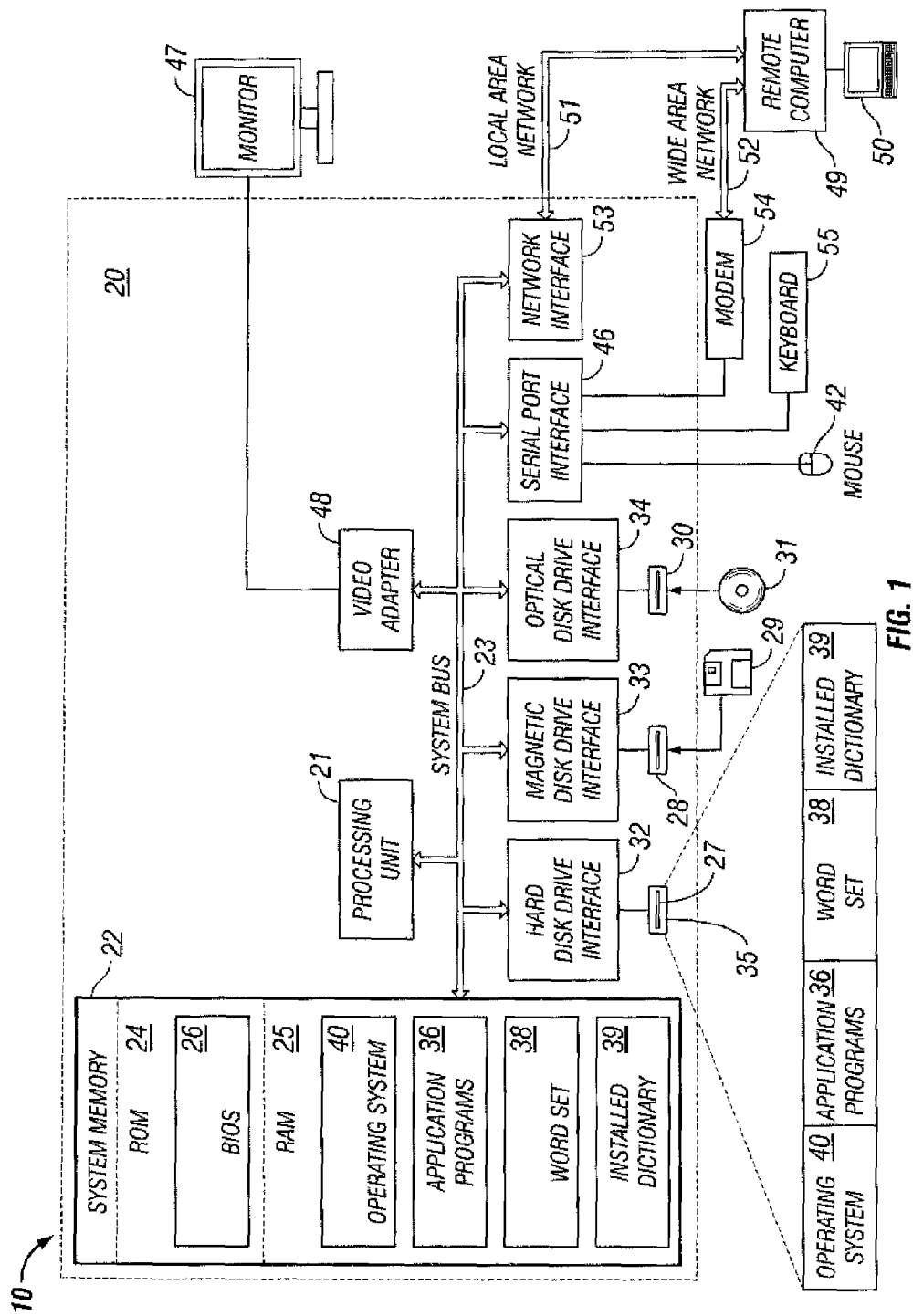
FIG. 1 is a schematic diagram of a system that is suitable for updating a dictionary on a computer system in accordance with the present invention.

The present invention provides systems, computer program products and methods that are useful for updating a dictionary on a computer system as part of a computer application program installation. While the methods and apparatus that are included in the field of data processing comprise a wide variety of programs and programming languages, those having ordinary skill in the art will appreciate that the present invention may be implemented without limitation to a particular program or programming language, a particular application program or a particular system.

Particular embodiments of the methods, computer program products and systems of the present invention are useful for updating a dictionary on a computer system. In a particular embodiment, a method of the present invention includes identifying a set of words included with an application program being installed on the computer system, identifying one or more installed dictionaries within the computer system and adding one or more words of the set to at least one of the installed dictionaries.

The developers of a computer application program may recognize that the application program includes many terms, phrases, acronyms, names and other words that are not in common usage. These words may include, for example, new words that were made up to describe or name the application, features or components of the application. The developers of the computer application program may also recognize that the application program is targeted for use in a highly specialized field having a vocabulary that includes words that are not commonly used. These highly specialized words that are either specific to a field or that are new words specific to the application program may be provided as a set of words within the application program so that, for example, upon installation of the program on a computer system, these words may be identified as a set of words useful for updating dictionaries that are installed on the computer system.

The words that are selected by the developers of the computer application program may be placed in a flat text file, in a table, in a database or in any other convenient form known to those having ordinary skill in the art. Optionally, the words may be grouped and identified according to language so that, for example, English words are grouped together and identified as English words, French words are grouped together and identified as French words and so forth.

Particular embodiments of the present invention may further include determining that at least one of the installed dictionaries on the system includes definitions and identifying one or more definitions included with the application program being installed. While spell checker dictionaries often only contain lists of words, computer systems may include dictionary applications that include both words and their definitions. For example, Merriam-Webster's Collegiate® dictionary, which includes both words and definitions, can be installed on a computer system. A dictionary may be determined to include definitions by, for example, checking for a definition field associated with each word in the dictionary or by comparing the identified dictionaries on the system with a list of known computer application dictionaries that include definitions. Once it has been determined that one of the installed dictionaries includes definitions, then the definitions associated with the words that are included with the application program may be added.

In particular embodiments of the invention, each word of the set of words included with the application program being installed on the computer system may be compared with entries in the identified installed dictionaries so that duplicate entries are not made in the installed dictionaries. After comparing the words with the installed dictionary entries, it may be determined whether any of the words that are to be added to the dictionary are duplicates of the entries. Comparing the words may include consideration of particular characterizations such as, for example, capitalization state, punctuation marks, e.g., such as accented characters, and combinations thereof. In particular embodiments, the user may be queried as to whether consideration should be given to such characterizations. For example, a dialogue box may be presented to the user that allows the user to select those particular characterizations that should be considered during the updating of the installed dictionaries.

As disclosed above, it may be advantageous to group and identify the set of words included with the application program by language, i.e., English, German, Japanese and so forth. While many computer systems have dictionaries and spell checkers installed in different languages, most computer system users communicate with the computer system input/output devices in just one language. Therefore, it may be advantageous in some applications to group the words so that only words of selected languages are identified for being added to the installed dictionaries on the computer system. For example, a dialogue box may provide a user with a selection of languages from which the user may then select those languages with which to update the installed dictionaries. Only those words in the selected languages would then be added to the installed dictionaries.

Alternatively, each installed dictionary that was identified may be examined to determine the language of the dictionary. Then, after determining whether the set of words includes the determined language, the dictionary may be updated with the words matching that language from the set of words. The language of the dictionary may be determined by, for example, comparing known file names for dictionaries identified on the system with a list of known file names for particular languages, identifying the alphabet, i.e., Greek Cyrillic, English or Arabic, comparing words of different languages with words entered in the identified dictionaries and combinations thereof.

The dictionaries that are installed on the system may be identified by searching the system for installed dictionaries. While any method known to those having ordinary skill in the art may be used for searching the system for installed dictionaries, one method includes searching the program files installed on the system and comparing each file against a list of known dictionary files, e.g., searching for the Merriam-Webster's Collegiate® dictionary and for the spell checker in the MICROSOFT WORD word processor.

The search for installed dictionaries may be conducted through a filter. For example, filters may limit the search for installed dictionaries to those that are in a particular language, from a particular application program or that are only associated with a spell checker. The user may be queried, for example, through a dialogue box to select filters through which the search for installed dictionaries may be conducted.

In particular embodiments of the present invention, the words from the set of words that are added to the installed dictionaries may be added with an application program interface (API), with a plug in or by other methods known to those having ordinary skill in the art. For example, an API is a set of routines, protocols and/or tools associated with a known operating system and/or application program. The API provides an interface with the operating system and/or application program for which it is associated. Therefore, by associating each of the installed dictionaries with one or more application programs, an appropriate API may be selected that is specific for the application program having the installed dictionary. The specific API may then be utilized as known to those having ordinary skill in the art to add each of the words to the installed dictionary.

FIG. 1 is a schematic diagram of a system that is suitable for updating a dictionary on a computer system. The system 10 includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 35 for reading from and writing to a hard disk 27, a magnetic disk drive 28 for reading from or writing to a removable magnetic disk 29, and an optical disk drive 30 for reading from or writing to a removable optical disk 31 such as a CD-ROM or other optical media. Hard disk drive 35, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, the operating system 40 and application programs 36 may be stored in the RAM 25 and/or hard disk 27 of the personal computer 20.

A user may enter commands and information into personal computer 20 through input devices, such as a keyboard 55 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, a mainframe, a personal digital assistant, an Internet-connected mobile telephone or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing high-speed communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

A number of program modules may be stored on hard disk 27, magnetic disk 29, optical disk 31, ROM 24, or RAM 25, including an operating system 40, application programs 36, the word set 38 associated with one of the application programs 36 and an installed dictionary 39 into which the words from the word set 38 will be added. Program modules include routines, sub-routines, programs, objects, components, data structures, etc., which perform particular tasks or implement particular abstract data types. Aspects of the present invention may be implemented in the form of an application program 36 associated with a word set 38 that will be used to update an installed dictionary 39. The application program 36 generally comprises computer-executable instructions for, inter alia, identifying the installed dictionary 39 and updating the dictionary 39 with the word set 38. The installed dictionary 39 generally comprises computer-executable instructions for providing the proper spelling of words used by a spell checker (not shown).

The described example shown in FIG. 1 does not imply architectural limitations. For example, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

It should be recognized therefore, that embodiments of the present invention may take the form of an entirely hardware embodiment, an entirely software embodiment or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

While inventive embodiments of methods are demonstrated in the following flow charts of the figures that follow, it should be realized that the demonstrated methods are exemplary methods provided by the present invention and may be implemented using computer code and/or a suitable system.

Figure 2:
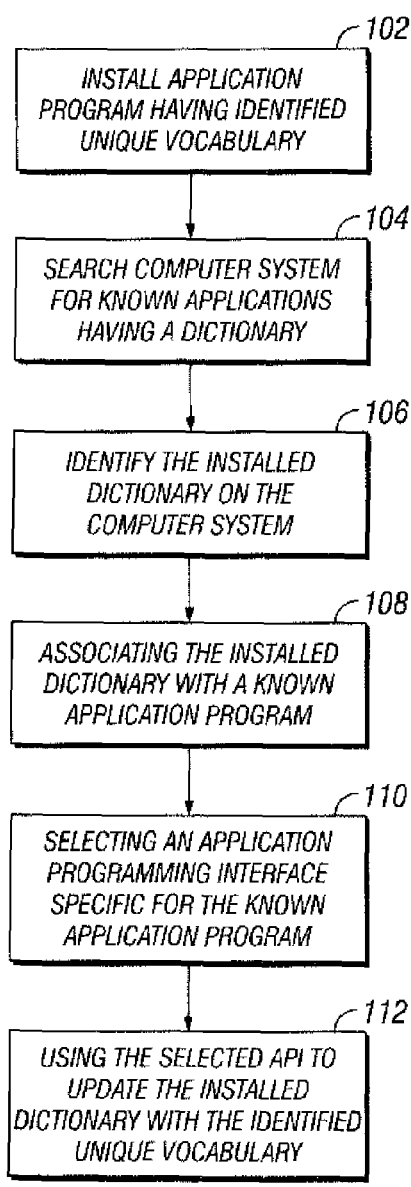
FIG. 2 is a flow chart of an exemplary method for updating a dictionary on a computer system.

FIG. 2 is a flow chart of an exemplary method for updating a dictionary on a computer system. In state 102, an application program having an identified unique vocabulary is installed on a computer system. In state 104, the exemplary method includes searching the computer system for known applications having a dictionary and in state 106, identifying the installed dictionary that is found during the search. In state 108, the method includes associating the installed dictionary with a known application program and in state 110, selecting an application programming interface (API) that is specific for the known application program. In state 112, the exemplary method includes using the selected API to update the installed dictionary with the identified unique vocabulary.

Figure 3:
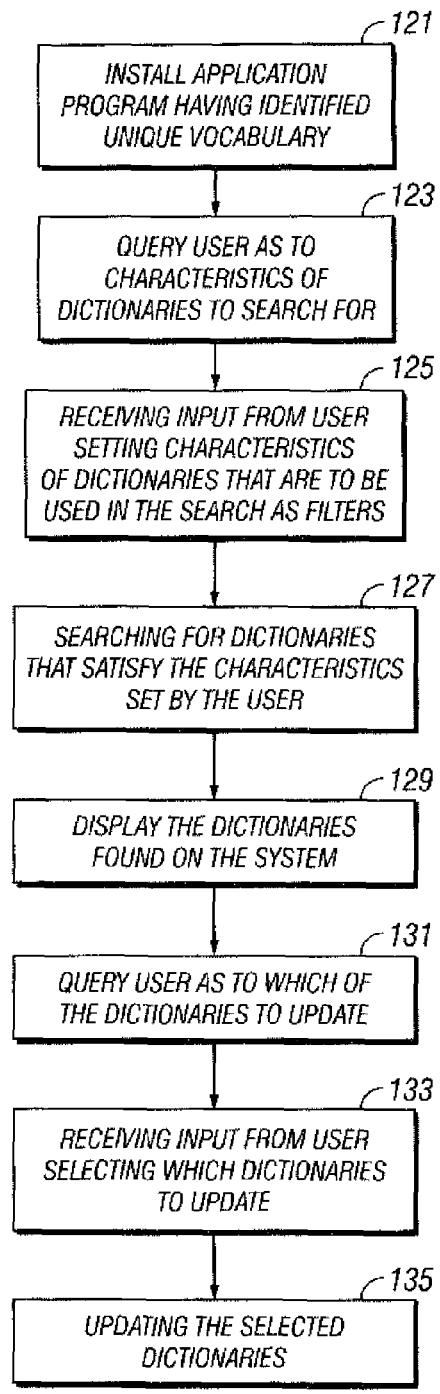
FIG. 3 is a flow chart of an exemplary method for searching for dictionaries to update using a filtered search.

FIG. 3 is a flow chart of an exemplary method for searching for a dictionary to update using a filtered search in accordance with the present invention. In state 121, an application program having an identified unique vocabulary is installed on a computer system. In state 123, the method includes querying the user as to characteristics of the dictionaries that should be searched for. Examples of such characteristics may include the language of the dictionary, whether the dictionary has definitions included, whether the dictionary is strictly used in a spell checker application and so forth.

In state 125, the exemplary method further includes receiving input from the user setting the characteristics of the dictionaries that are to used in the search as filters and, in state 127, searching for dictionaries that satisfy those characteristics set by the user. Optionally, in state 129, the method may include displaying the dictionaries found on the system as a result of the search and, in state 131, querying the user as to which of the dictionaries to update. Then, in state 133, the exemplary method further includes receiving input from the user selecting the dictionaries to update and in state 135, updating the selected dictionaries with the identified unique vocabulary.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A method for updating a dictionary on a computer system, comprising:
   identifying a set of words included with an application program being installed on the computer system;
   identifying one or more installed dictionaries within the computer system;
   adding one or more words of the set to at least one of the installed dictionaries;
   associating the one or more installed dictionaries with one or more installed application programs;
   identifying an application programming interface that is specific for at least one of the installed application programs; and
   utilizing the specific application programming interface to add the one or more words of the set to the at least one of the installed application programs.

2. A non-transitory computer program product comprising a non-transitory computer useable storage medium having computer usable code for updating a dictionary on a computer system, the non-transitory computer product comprising:

computer useable program code for identifying a set of words included with an application program being installed on the computer system;

computer useable program code for identifying one or more installed dictionaries within the computer system;

computer useable program code for adding one or more words of the set to at least one of the installed dictionaries;

computer useable program code for associating the one or more installed dictionaries with one or more installed application programs;

computer useable program code for identifying an application programming interface that is specific for at least one of the installed application programs; and computer useable program code for utilizing the specific application programming interface to add the one or more words of the set to the identified application program.

3. A system for updating a dictionary on a computer system, the system comprising:

one or more processors coupled directly or indirectly to one or more memory devices and input/output devices, the input device adapted for loading an application program into at least one of the memory devices during installation of the application program on the computer system, wherein the application program includes a data structure populated with a set of words;

one or more installed dictionaries stored on at least one of the one or more memory devices and accessible by the one or more processors; wherein the application program includes a logical structure to provide instructions to the one or more processors for updating the dictionary on the computer system including identifying the set of words included with the application program, identifying the one or more installed dictionaries and adding one or more words from the set to at least one of the dictionaries, the application program further providing instructions to the one or more processors for associating the one or more installed dictionaries with one or more installed application programs, identifying an application programming interface that is specific for at least one of the installed application programs and utilizing the specific application programming interface to add the one or more words of the set to the identified application program.

* * * * *